106-84

Patented Dec. 18, 1928.

1,696,011

UNITED STATES PATENT OFFICE.

HARRY R. PENNINGTON, OF CHICAGO, ILLINOIS, AND CHARLES H. HOLLUP, OF MILWAUKEE, WISCONSIN, ASSIGNORS TO C. H. HOLLUP CORPORATION, A CORPORATION OF ILLINOIS.

ARC-WELDING ELECTRODE.

No Drawing.  Application filed September 8, 1924.  Serial No. 736,624.

This invention relates to improvements in electrodes of the type used at present in electric arc welding practice. In welding pieces of metal, or in building up a piece by depositing thereon the molten metal of an electrode, it is often desirable that the deposited metal have a certain percentage of carbon therein. It is known that a weld made by, or metal deposited by an electrode having a certain carbon content will not have the same percentage of carbon as the electrode, due to dissipation of the same during the welding operation. Oftentimes it is found that the deposited metal contains not more than fifty per cent of the carbon present therein before fusing. It is not entirely practical to provide the electrode itself with such a quantity of carbon that the deposited metal will have the desired percentage after cooling since difficulties arise in drawing the wire or rods of which the electrodes are formed where the metal has a high carbon content, especially where the wires are of relatively small diameter.

The principal object of our invention therefore is to overcome the difficulties mentioned by providing electrodes which will assure that the resulting weld or deposit of metal will have the desired percentage of carbon therein. In carrying out our invention, we may use electrodes which have a carbon content much less than that desired for the deposited metal, the difference being supplied by a coating applied to the electrode before the welding operation.

Under present day practice, a mild steel rod having a relatively small percentage of carbon will make a weld of not more than one-tenth of one percent carbon content. Such a mild steel rod after having been coated in accordance with our invention will make a weld which may have a carbon content of over one percent, if desired. The quantity of carbon in the weld may be varied by varying the coating applied to the electrode.

We are aware that it has been proposed heretofore to increase the carbon content of the weld metal by coating the electrode with a form of carbon and binder, but commercial success has not been attained due to the fact that the applied carbon is lost by oxidization, or otherwise, during the welding operation which results in the weld metal having a variable or unreliable percentage of carbon.

The ingredients of which our coating for the electrode is composed may consist of a compound of an alkaline earth metal, preferably barium carbonate, which is suitably mixed with approximately an equal quantity by volume of powdered carbon, preferably in coke form, said mixture being made into a paste by the addition of a diluted solution of sodium silicate. The electrodes are coated with this mixture either by applying the same thereto by hand, as with a brush, or by dipping the electrodes into the mixture. Various proportions of the ingredients may, of course, be used when found desirable.

It will be found that the metal deposited by our coated electrode will have a uniform distribution of carbon throughout its mass, the quantity of which can be varied as desired by varying the quantity of the coating applied to the electrode.

By way of example, it might be stated that analysis of the weld metal where a one-eighth inch electrode was used having a carbon content of one-tenth of one percent and a coating of our composition one-thirty-second of an inch in thickness, showed a carbon content of the weld metal of one and 66/100 percent. We have also found that an increase in the quantity of carbon given to the weld metal will result if the electrode forms the anode or positive terminal of the arc.

This is the reverse of the general practice in electric welding at the present time, particularly when coating is applied to an electrode of mild steel. It has also been found that the use of an electrode having a low carbon contact (which has a lower maganese or silicon content than an electrode having a high percentage of carbon) is an advantage in welding, in that the weld deposited by use of an electrode of low manganese content is less liable to develop small cracks caused by rapid cooling, and more successful welds therefore result.

Instead of carbon in coke form, we have also used lampblack, flour, paper, charcoal, commercial carbonizing compounds, starch and other materials.

Although we have disclosed preferred ingredients for compounding our coating and the manner of using the same, we do not wish to be restricted specifically thereto except where limitations appear in the appended claim.

What we claim is:

A coating for welding rods comprising a mixture of barium carbonate, and powdered carbon in substantially equal volumes and a diluted solution of sodium silicate.

In testimony whereof, we have subscribed our names.

HARRY R. PENNINGTON.
CHARLES H. HOLLUP.